United States Patent [19]

Irmer

[11] Patent Number: 4,474,723
[45] Date of Patent: Oct. 2, 1984

[54] METHOD AND APPARATUS FOR PROVIDING A PLASTIC PIPE PART WITH A SOCKET END

[75] Inventor: Adolf Irmer, Geeste, Fed. Rep. of Germany

[73] Assignee: Wavin B.V., Zwolle, Netherlands

[21] Appl. No.: 487,637

[22] Filed: Apr. 22, 1983

[30] Foreign Application Priority Data

Apr. 23, 1982 [NL] Netherlands .................. 8201709

[51] Int. Cl.³ .................................................. B29D 7/24
[52] U.S. Cl. ................................. 264/296; 264/249; 264/295; 425/393; 425/DIG. 28
[58] Field of Search ............. 264/249, 295, 296, 573; 425/387.1, 393, DIG. 28, 503

[56] References Cited

U.S. PATENT DOCUMENTS

| | | | |
|---|---|---|---|
| 3,776,682 | 12/1973 | Parmann | 425/393 |
| 3,887,674 | 6/1975 | Oostenbrink | 425/393 |
| 3,893,794 | 7/1975 | Acda | 425/393 |
| 3,998,578 | 12/1976 | Acda | 425/393 |
| 4,065,243 | 12/1977 | Acda et al. | 425/393 |
| 4,156,710 | 5/1979 | Carroll et al. | 264/296 |
| 4,279,853 | 7/1981 | Ohta et al. | 264/296 |
| 4,281,979 | 8/1981 | Doherty et al. | 425/393 |
| 4,386,044 | 5/1983 | Arndt et al. | 264/296 |
| 4,386,045 | 5/1983 | Väisänen | 264/296 |
| 4,394,343 | 7/1983 | Acda et al. | 264/296 |
| 4,412,802 | 11/1983 | Ohta et al. | 425/393 |

Primary Examiner—John E. Kittle
Assistant Examiner—Willie Thompson
Attorney, Agent, or Firm—Wilkinson, Mawhinney & Theibault

[57] ABSTRACT

A plastic pipe part 1 is pushed across a head part 3 of a sealing sleeve 4, being supported by a support 8, thereby providing the plastic pipe part with a widened end 7. Subsequently the widened end is surrounded by an outer mold 11 with three successive widenings 12, 14, 15 and by means of a fluid pressure in the interior of the widened end 7, sealed by the head part 3, the widened end is provided with three socket end widenings 28, 22, 29. After removal of the support 8 the end portion 6 of the socket end is inwardly rebent around the head part 3 thus forming a groove chamber 5 retaining the head part 3 of sealing sleeve 4. Pushing the plastic pipe part across the head part is facilitated by applying a fluid pressure. An apparatus for performing this method comprises an outer mold 5 with three successive mold widenings 12, 14, 15, a first mandrel 20, a second mandrel 21, a third mandrel 30, a fourth mandrel 31, a removable support mandrel 8, a rebending member 26 and a supply conduit 10 for supplying a fluid under pressure in the space between outer mold 11 and the mandrels 30, 20, 21.

9 Claims, 4 Drawing Figures

METHOD AND APPARATUS FOR PROVIDING A PLASTIC PIPE PART WITH A SOCKET END

BACKGROUND OF THE INVENTION

1. Field of the Invention

The present invention relates to a method of providing a plastic pipe part with a socket end and a head part of an annular sealing member being retained in a groove chamber, formed by inwardly rebending an end portion of the socket end.

2. Description of the Prior Art

Such a method has been used in the art. In said known method use is made of a plastic pipe part with a socket end comprising three widenings, having increasing inner diameters, the last widening being applied in the head part of a sealing sleeve and subsequently an end portion of the third widening being inwardly rebent for forming a groove chamber. Said known method is very advantageous as a plastic pipe part with a socket end can be obtained in a plant while the sealing member is retained in a reliable manner, the inward rebending of the end portion of the third widening around the head part of the sealing member causing the assembly to remain undamaged if the front part of the finished plastic pipe with socket end will hit the bottom under a high impact load, for instance, when such pipes are unloaded from a van.

A drawback of this known method is, however, that a plastic pipe first has to be provided with three widenings and subsequently, in a later stage, with the sealing member, followed by inwardly rebending the end portion of the third widening.

SUMMARY OF THE INVENTION

The present invention aims to provide a much simpler method in which an initial plastic pipe part already provided with the required sealing member can be used for widening said pipe part in order to form the socket end.

This object is achieved in accordance with the invention in that the space between the inner side of a widened end of a plastic pipe and a support placed thereinbetween at distance from the free end of the plastic pipe part, is sealed by the retained sealing member, whereupon the plastically deformable end part of the plastic pipe part is shaped to a socket end and the end portion of the socket end is inwardly rebent after removal of said support.

In this way the sealing member forms a seal so that a high fluid pressure can be exerted in the interior of the plastic pipe part, thus causing said plastic pipe part to obtain the shape of an outer mould surrounding said plastic pipe part and provided with walls adapted to the widenings of the socket end.

An appropriate seal is obtained by means of the head part of the sealing member, the support preferably consisting of a mandrel.

The widened end of a plastic pipe is very advantageously shaped by pushing the widened end part across a sealing member bearing upon a support. Preferably a fluid pressure is supplied to the interior of the portion of the plastic pipe part to be deformed during the movement of the plastic pipe part across the sealing member, whereby the fluid pressure acts as a lubricating means between the plastic pipe part and the sealing member, thus providing a cup-shaped widened end in an easier manner which due to the internal fluid pressure, can subsequently easier be shaped to the desired socket end.

The present invention in another aspect relates to apparatus for performing the method according to the invention, comprising an outer mould with three mould widenings for receiving three widenings of a socket end, a bending member for inwardly rebending an end portion of the socket end, the apparatus comprising a sealing member support, sealing member support retaining means and a supply conduit for creating an internal fluid pressure in the interior of the plastic pipe part following the sealing member support.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWINGS

FIG. 1 shows a first step in performing the method of the invention;

DESCRIPTION OF THE PREFERRED EMBODIMENTS

Figure 2:
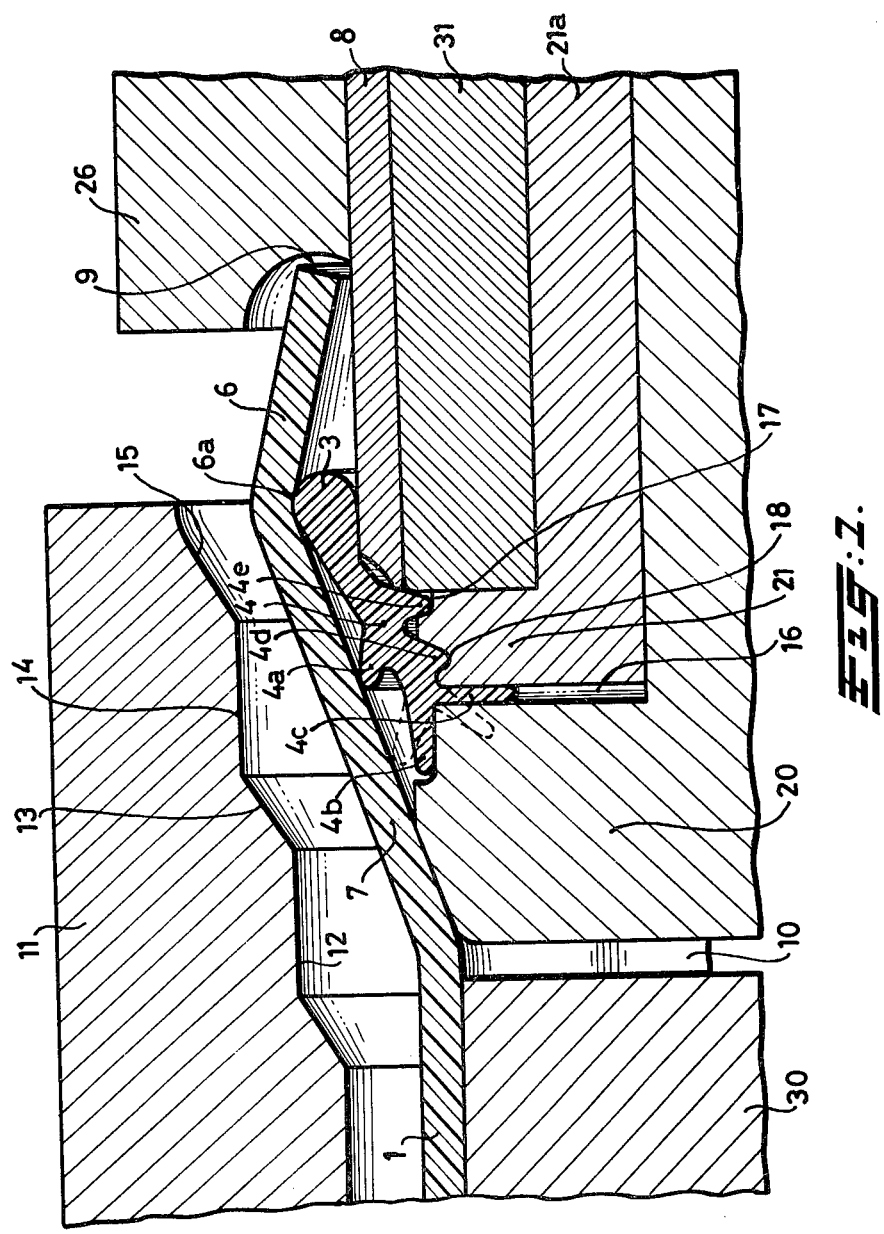
FIG. 2 a second step in performing the method of the invention.
Figure 2:
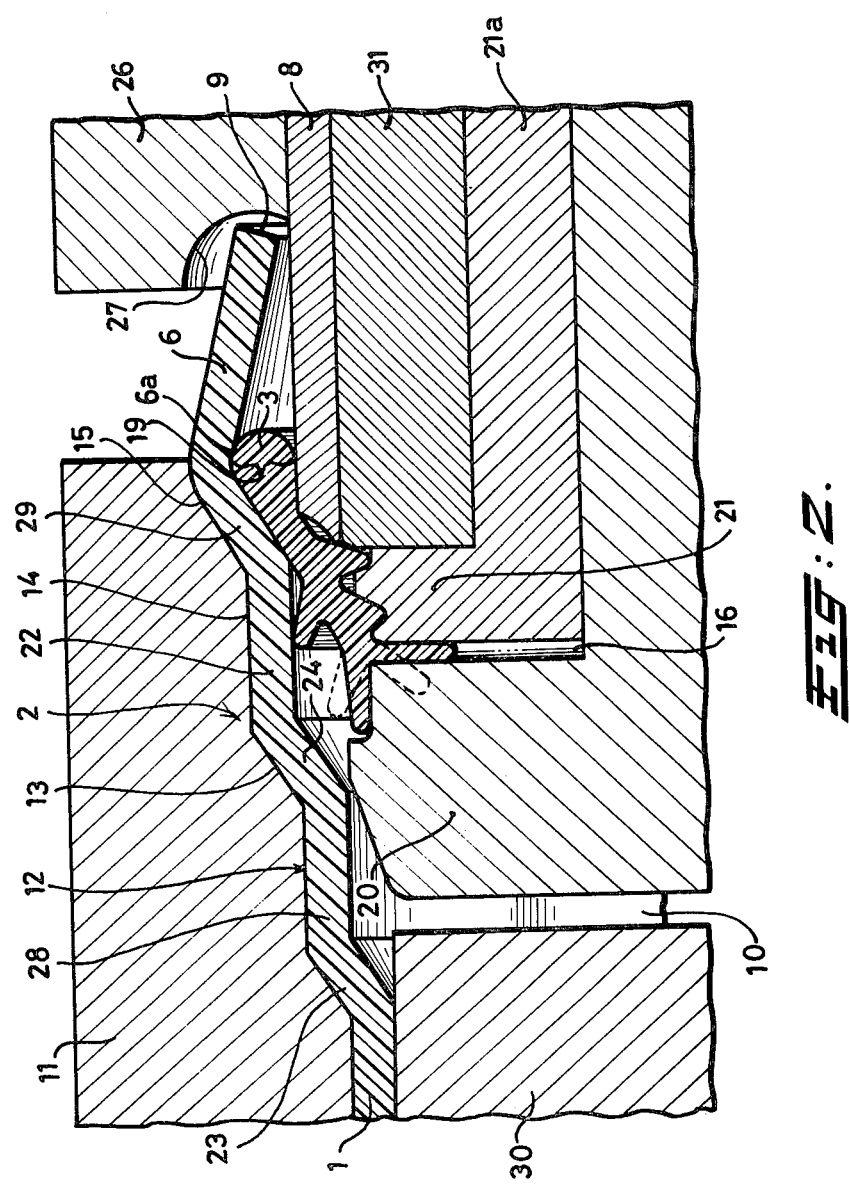

FIG. 1 illustrates the first step in performing the method according to the invention, wherein the head part 3 of a sealing sleeve 4 is placed upon a sealing member support mandrel 8. Said sealing sleeve further comprises sealing lips or ribs 4a, 4b, 4c, 4d and 4e, of which the lips 4d and 4e are accomodated in recesses 17 and 18 of a second mandrel 21. As lip 4c is retained in a space 16 between a first mandrel 20 and second mandrel 21, the sealing member is retained and cannot possibly be shifted.

Furthermore, an outer mold 11 is illustrated comprising an inner wall 12 merging via a tapering transitional wall 13, into an inner wall 14 having a greater diameter than the portion comprising the inner wall 12, and subsequently merging into a conically widened end part 15 of the mold.

A heated plastic pipe portion 1 is pushed across a third mandrel 30 and first mandrel 20 and subsequently across the head part 3 of a sealing member 4, so that a widened end 7 of plastic pipe portion 1 is formed, said widened end 7 merging into a likewise widened end portion 6 having a front end 9. Due to the elastic properties of the plastic material, said end part 6 will try to regain its original shape beyond head part 3 of the sealing member.

To easier shape the widened end 7, it is recommended that a gaseous fluid pressure is supplied through aperture 10 between the third mandrel 30 and first mandrel 20. During said deformation the fluid pressure also supports the heated and deformed portion 7.

FIG. 2 illustrates that outer mold 11 is brought into its working position whereupon a fluid of increased pressure is supplied through apertures 10. In order to prevent escape of fluid pressure in the form of pressurized air, the space 19 between support mandrel 8 and the widened end of the plastic pipe 1 is sealed by the head part 3. In this way widened part 7 of the plastic pipe part will be inflated and adjoin walls 12, 13, 14 and 15 of the outer mold 11.

Hereupon the first socket end widening 22, a second socket end widening 28 as well as the transitional portion 23 between pipe part 1 and the latter socket end widening 28, as well as the transitional portion 24 and the end widening 29, are cooled.

End portion 6, however, of the widened part is not cooled.

Figure 3:
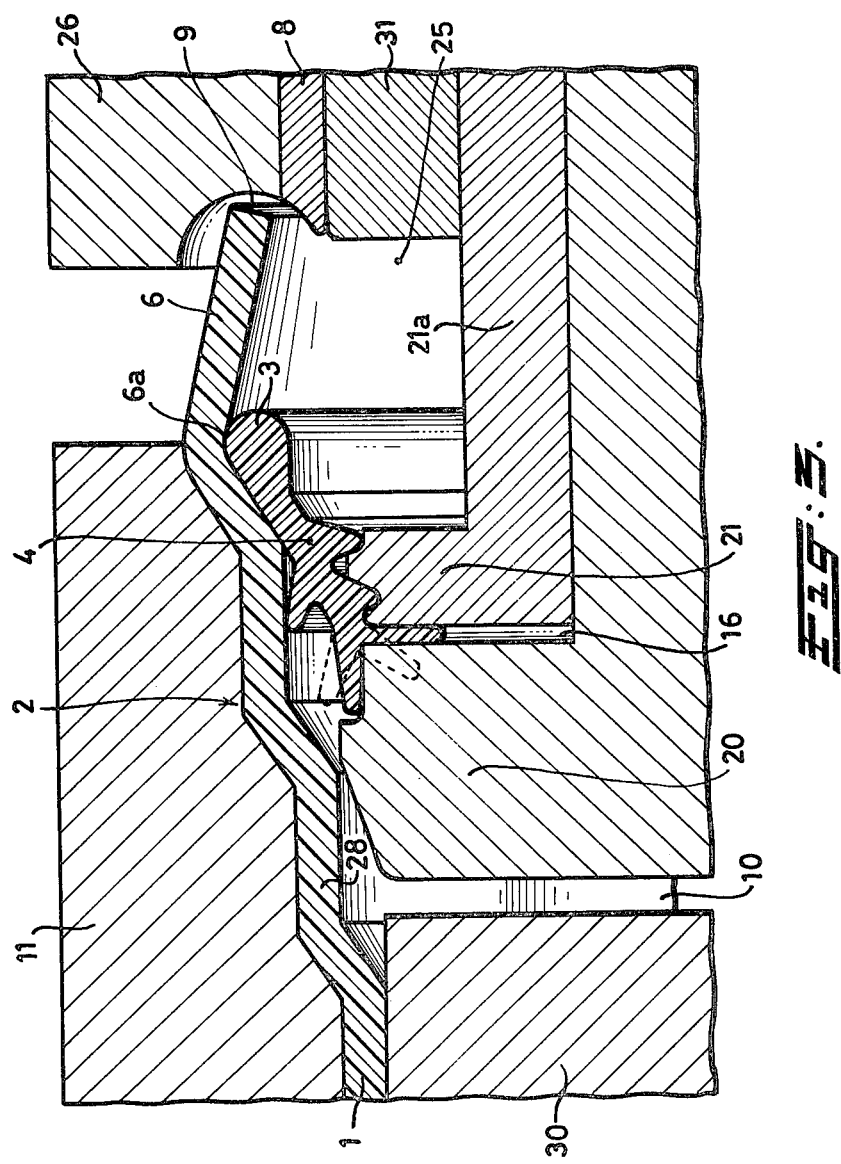
FIG. 3 a third step in performing the method of the invention.

Subsequently, support mandrel 8 is removed, together with a fourth mandrel 31 disposed within the later support mandrel 8; this situation is illustrated in FIG. 3. In a next step rebending member 26 having a rounded inner wall 27, together with mandrel 8 and mandrel 31, are displaced into the direction of the first mandrel 20. The entire assembly is supported by central portion 21a of the second mandrel. The presence of space 25 will enable end portion 6 to be easily rebent.

As soon as rebending member 26 and the support mandrel 8 have reached their final position, in which rebending member 26 adjoins the outer mold 11, the fourth mandrel 31 is further displaced until said mandrel adjoins the second mandrel 21. Thereby the extremity of end portion 6 is disposed below head part 3 of sealing member 4.

Figure 4:
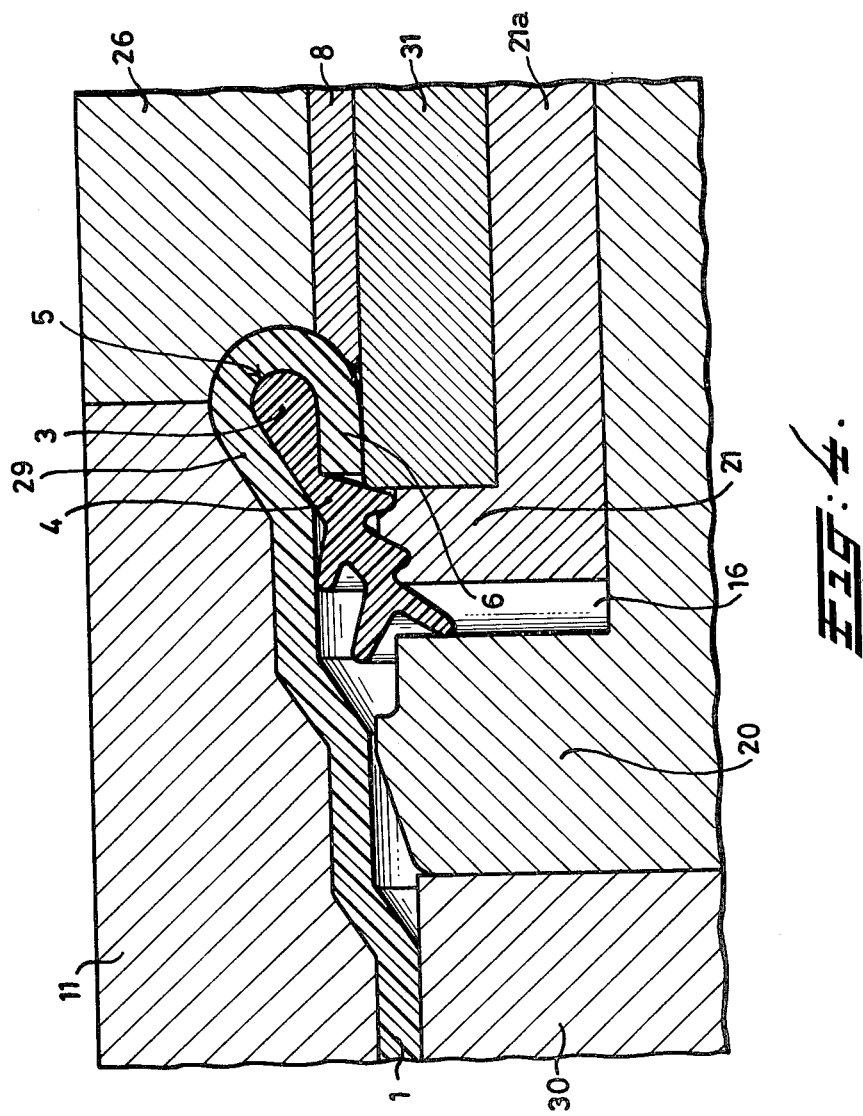
FIG. 4 a final step in performing the method of the invention.

After having reached the final position as illustrated in FIG. 4, a groove chamber 5 has been formed in which the head part 3 of sealing member 4 is retained by inwardly rebent portion 6.

Finally, first mandrel 20 is displaced into the direction of the third mandrel 30, so that lip 4c is no longer subjected to a clamping action.

The socket end is also provided with a second socket end widening 28, in which the front end of a male pipe part is accomodated. Said second socket end widening merges into the wall of pipe part 1, through a sloping transitional part 23.

Although the present invention has been shown and described in connection with the preferred embodiments thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. Method of providing a plastic pipe part with a socket end, comprising a head part of an annular sealing member being retained in a groove chamber formed by inwardly rebending an end portion of the socket end, wherein the space between the inner side of a widened end of a plastic pipe part and a support placed thereinbetween at distance from the free end of of the plastic pipe part, is sealed by the retained sealing member whereupon the plastically deformable end part of the plastic pipe part is shaped to a socket end and the end portion of the socket end is inwardly rebent after removal of said support.

2. The method of claim 1, wherein the widened end of a plastic pipe part is shaped by pushing a heated end part across a sealing member bearing upon a support.

3. The method of claim 1, wherein a fluid pressure is supplied to the interior of the portion of the plastic pipe to be deformed during the movement of the plastic pipe part across the sealing member.

4. The method of claim 1, wherein during pushing the pipe part across the mandrel and the sealing member a fluid pressure is supplied.

5. The method of claim 1, wherein the sealing action is performed by means of the head part of the sealing member.

6. The method of claim 2, wherein the support consists of a mandrel.

7. The method of claim 1, wherein, prior to inwardly rebending of the end portion the shaped parts of the socket end, with the exception of the end portion to be inwardly rebent, are cooled.

8. Apparatus for performing a method according to claim 1, comprising an outer mold with three mold widenings for receiving three widenings of a socket end, a rebending member for inwardly rebending an end portion of the socket end, wherein the apparatus comprises a sealing member support, sealing member support retaining means and a supply conduit for creating an internal fluid pressure in the interior of the plastic pipe part following the sealing member support.

9. The apparatus of claim 8, wherein the sealing member retaining means consist of a first and a second mandrel being movable with respect to one another.

* * * * *